United States Patent

Seefluth

[15] 3,640,665
[45] Feb. 8, 1972

[54] TANGENTIALLY SLIDING NECK SWAGING MECHANISM

[72] Inventor: Charles L. Seefluth, Bartlesville, Okla.
[73] Assignee: Phillips Petroleum Company
[22] Filed: Dec. 19, 1969
[21] Appl. No.: 886,722

[52] U.S. Cl. ................................. 425/297, 425/326
[51] Int. Cl. ........................... B29d 23/04, B29d 23/03
[58] Field of Search ........... 18/12 DM, 5 B, 19 TM, 19 TE, 18/14 A, 14 M

[56] References Cited

UNITED STATES PATENTS

| 3,271,502 | 9/1966 | Wentorf | 18/16 R X |
| 2,260,479 | 10/1941 | Picking | 18/12 DM UX |
| 2,578,229 | 12/1951 | Clement et al. | 18/12 DM UX |
| 2,664,996 | 1/1954 | Andrens | 18/12 DM UX |
| 2,890,483 | 6/1959 | Soubier | 18/5 BE UX |
| 3,303,249 | 2/1967 | Strauss | 18/5 BA X |
| 3,503,099 | 3/1970 | Uhlig | 18/5 BE X |
| 3,031,365 | 4/1962 | Marchioli et al. | 18/19 TE X |

FOREIGN PATENTS OR APPLICATIONS

| 1,109,137 | 4/1968 | Great Britain | 18/5 BQ |
| 956,165 | 1/1965 | Japan | 18/5 BM |

*Primary Examiner*—J. Spencer Overholser
*Assistant Examiner*—Michael O. Sutton
*Attorney*—Young and Quigg

[57] ABSTRACT

Apparatus for forming a large diameter parison or the like into a smaller diameter neck area of the like comprises at least three swaging jaws adapted to slide in a generally tangential relationship to the material being formed, adjacent jaws being in sliding contact with each other.

3 Claims, 7 Drawing Figures

PATENTED FEB 8 1972

INVENTOR.
C. L. SEEFLUTH

BY

*Young & Quigg*

ATTORNEYS

INVENTOR.
C. L. SEEFLUTH

BY

*Young & Quigg*

ATTORNEYS

TANGENTIALLY SLIDING NECK SWAGING MECHANISM

BACKGROUND OF THE INVENTION

This invention relates to an apparatus for constricting the size of a workpiece; in a more specific aspect, it relates to an apparatus for forming the neck and/or thread area of a hollow tubular parison preform.

Hollow articles have traditionally been made through blow-molding techniques by extruding a molten parison from an annular die orifice and thereafter closing mold parts about the freshly extruded parison which is then expanded by internal fluid pressure to conform to the mold walls. Because of the molten nature of the parison, considerable leeway is provided for forming the neck finish, and by programmed parison extrusion and the like, for forming the neck finish, and by programmed parison extrusion and the like, for forming large and/or irregularly shaped objects.

Recent developments in the blow-molding field have included a technique for forming parison preforms which are heated to orientation temperature and biaxially oriented to give high-strength, surprisingly clear articles. Such techniques are broadly disclosed in Turner et al., U.S. Pat. No. 3,390,426, and Wiley, U.S. Pat. No. 3,288,317, for instance. However, there are certain problems inherent with dealing with a parison at the temperature necessary to effect orientation. Particularly in regard to molding bottles having configurations which are relatively common in bottles made by the older processes, for instance, bottles having a relatively small neck, there is the inherent difficulty that with a parison preform sufficiently small to form a neck of the proper size, there may be insufficient material in the bulk of the parison to provide adequate wall thickness in the resulting article. Since the most economical method of forming parison preforms is simply to extrude a continuous length of tubing and thereafter cut it into individual workpieces or parisons, it is preferable not to attempt to solve these difficulties by injection-molding a parison preform having a reduced size in the neck-forming area, since this would add to the expense. Further, any technique which is to be utilized must avoid the formation of flash in the thread area, since one of the advantages of operation with parison preforms is that the resulting article direct from the mold requires no postforming or trimming operations.

SUMMARY OF THE INVENTION

It is an object of this invention to provide an improved apparatus for constricting the size of a workpiece;

It is a further object of this invention to allow blowing a large bottle or the like having a small neck from a parison preform at orientation temperature;

It is still a further object of this invention to economically produce parisons having reduced diameter in the thread-forming area;

It is still yet a further object of this invention to avoid flash in the neck area of bottles made from parison preforms; and It is still yet a further object of this invention to provide apparatus for compression forming an open end of a parison preform at orientation temperature.

In accordance with this invention, at least three swaging jaws are provided which slide in a direction generally tangential to the workpiece, adjacent jaws being in sliding contact so as to allow compression forming the workpiece without the production of flash.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
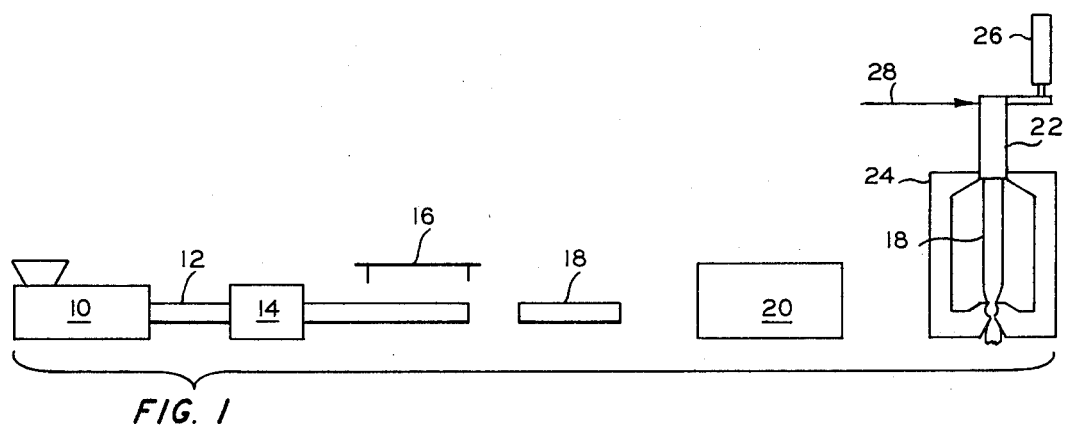
FIG. 1 is a schematic representation of apparatus adapted to utilize the instant invention.

This invention is applicable to the constriction of any type of workpiece such as plastic, metal, molten glass, and the like. It is particularly applicable to the formation of biaxially oriented articles having a relatively small neck and/or thread area compared with the body portion of said article.

The invention is applicable for the production of these biaxially oriented bottles from any orientable thermoplastic resin. Exemplary resins include polyolefins, poly(vinyl chloride), acrylonitrile-butadiene-styrene, and other styrene/butadiene-containing polymers, polyamides, polyvinylidene chloride polymers and copolymers, polystyrene, and the like. Preferred resins include crystalline polymers such as polymers of at least one mono-1-olefin having two to eight carbon atoms per molecule, more preferably polymers and copolymers of ethylene, propylene, and 1-butene, with polypropylene being especially preferred.

The thermoplastic is freshly extruded or molded into parison preforms and cooled to solidify same. The parisons are then heated to orientation temperature, which in the case of olefin polymers, is generally about 1°–50°, preferably 5°–25° F., below the crystalline melting temperature. The crystalline melting temperature can be determined by placing a small sample of the material to be tested on a heating stage of a polarizing microscope and recording the crystalline melting point as that temperature at which the last birefringence disappears on slow heating. For amorphous materials, the orientation temperature is that temperature well below the point where the polymer is visibly molten. For instance, with PVC, a temperature of 220°–250° F. is satisfactory, although temperatures up to 340° F. can be used. The parison preforms can be heated to this orientation temperature in an air oven, in a liquid bath, in a heating block, or by subjecting them to radiant heat or any other suitable means.

The instant invention is applicable to the formation of any article wherein the ratio of the maximum outside diameter of the body portion to the outside diameter of the thread and/or neck area is relatively large, preferably greater than about 3:1, more preferably within the range of 4:1 to 20:1. Specifically, the neck area can be reduced in diameter in an amount up to 50 percent or more, preferably 20–40 percent.

The reduced neck area can have a wall thickness which is the same as, less than, or more than the initial parison. Generally, the final wall thickness will be about the same or within the range of 10–50 percent less than the initial wall thickness. The compression ratio, that is, the ratio of volume of material in the area of the work piece before the compression-forming operation to the volume after the operation can be within the range of 1.2:1 to 5:1, preferably 2:1 to 3:1.

While the swaging mechanism of the instant invention can be utilized in dealing with materials either solid or molten, in the preferred embodiment, where parison preforms at orientation temperature are reduced in diameter at one end thereof, the manipulative operations, while generally carried out at ambient temperature, are carried out under a sufficiently rapid sequence that the polymer remains at orientation temperature throughout the operation so as to achieve molecular orientation in the final product.

Referring now to the drawings, particularly FIG. 1, there is shown one apparatus in which the swaging mechanism of the instant invention can be utilized, although it is emphasized that the invention has wide utility in other areas. This mechanism comprises an extrusion means 10 for forming a tubular extrudate 12. Tubular extrudate 12 passes through vacuum cooling and sizing chamber 14 and thence to cutting mechanism 16 where it is severed into individual parison preforms 18. Workpieces 18 are heated to orientation temperature in air oven 20 and transferred by means not shown to thread-forming head 22 comprising the tangentially sliding swaging mechanism of the instant invention adjacent mold 24. The parison is stretched axially by means of moving the thread-forming head upward by means of air cylinder 26. The parison is then expanded into conformity with the mold wall by means of fluid pressure introduced through line 28.

Figure 2:
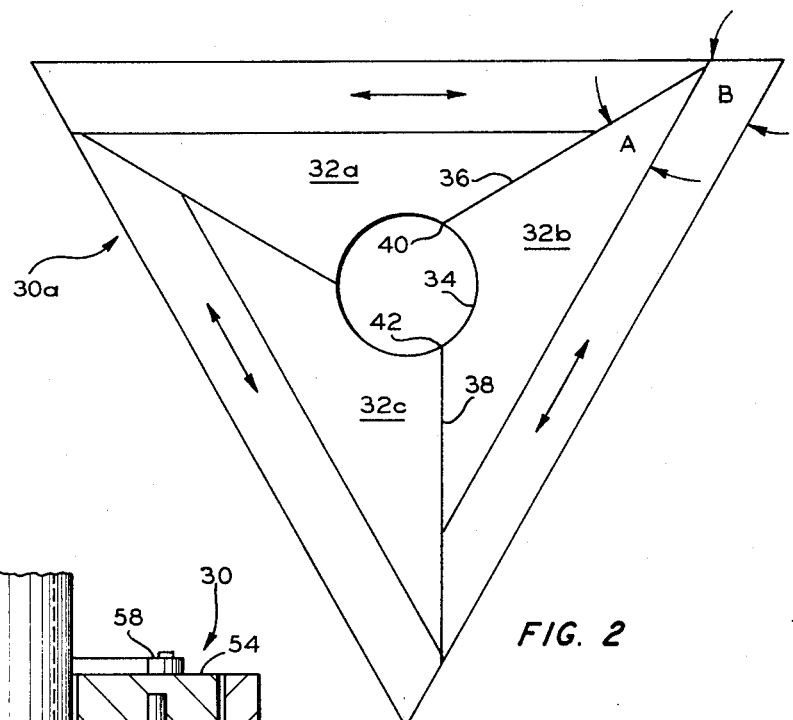
FIG. 2 is a schematic representation of the swaging jaws showing the simplest embodiment of the invention.

Referring now to FIG. 2, there is shown in schematic representation a swaging mechanism 30a embodying the simplest possible configuration wherein only three jaws labeled 32a, 32b, and 32c are utilized. The swaging jaws do not move radially in toward the center nor do they pivot. Rather, they slide as indicated by the arrows in somewhat of a tangential relationship to the center. As they slide, as indicated by the arrows, to open and close, the adjacent surfaces remain in constant sliding contact so that at no time is there any gap between adjacent members to produce flash as would be the case in jaws moving radially. Also, because of this arrangement, the swaging jaws can have a considerable thickness, thus allowing the formation of an entire neck and/or thread area, as opposed to the rather narrow limitations imposed by iris diaphragm-type mechanisms.

Viewing jaw 32b, for instance, it can be seen that this jaw has a forming surface 34; these forming surfaces then, on closing of the jaw members form a continuous forming mold as shown in this FIGURE. This jaw further has a first side surface 36, which is in sliding contact with jaw member 32a, and a second side surface 38, which is in sliding contact with jaw member 32c. Point 40 on forming surface 34 moves radially as the jaw member 32 slides back and forth. This is in marked contrast to conventional radially moving members wherein the center portion of the jaw member would be moving in a radial direction. The angle labeled A between the direction of movement of jaw member 32b and the interface between adjacent jaw members 32a and 32b is equal to 90−(360/2n), with n being the number of jaws which must be at least 3. Thus, for three jaws, this angle is 30°, for four jaws it is 45°, for six jaws it is 60°, for eight jaws it is 67.5°, and the like. Angle B which is the angle between the directions of movement of adjacent swaging jaws is equal to 180−(360/n). Thus, angle B is 60° for three jaws, 90° for four jaws, 120° for six jaws, 135° for eight jaws, and the like. As used herein, the term "forming surface" of the jaw members is meant to refer to that portion of the jaws such as jaw 32b between point 40 and point 42. Of course, as the jaws are closing, the workpiece is also contacted by a portion of the side of jaw 32a adjacent side 36 of jaw 32b between point 40 and the point on 32a corresponding to point 42. The same, of course, is true for the other jaws.

It is noted that a portion or all of the forming jaws at either point 40 or 42 could be cut back slightly. If a portion of the jaw near point 40 is cut back slightly, then the leading portion of jaw 32b which is in sliding contact with jaw 32a does not quite move on a radius but rather moves parallel to a radius; however, such an arrangement is nevertheless quite satisfactory for producing excellent detail in a finished part such as a threaded neck of a bottle. To be technically correct, it would be necessary to say that point 40 moves adjacent and parallel to a radius rather than on a radius since theoretically the radius would be along the interface between point 40 and the adjacent surface of jaw 32a, but it is understood that it moves along a radius under the common meaning of the term.

As can be seen from FIG. 2, each jaw is in the form of an isosceles triangle with the forming surface between points 40 and 42 simply being cut out along a point starting at the apex of the triangle. Of course the jaw does not have to actually be in the form of an isosceles triangle as can be seen from the jaws of the subsequent FIGURES but a projection of the surfaces in sliding contact would form an isosceles triangle.

The instant invention has the added advantage, when dealing with materials at orientation temperature or other materials not thoroughly molten and easily moldable, of having a large contact area along the sliding surfaces, for instance, along side 36 of 32b as it slides against the adjacent wall of member 32a. Thus, where great pressure must be utilized to form materials which are not easily moldable, the wear can be distributed over a larger area.

Figure 3:
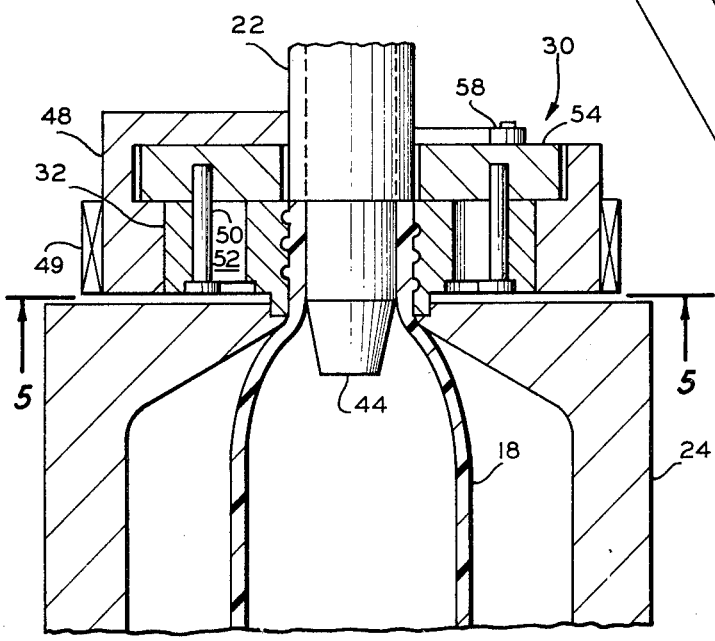
FIG. 3 is a longitudinal sectional view showing the swaging mechanism of the instant invention in conjunction with a molding operation.

Referring now to FIG. 3, there is shown thread-forming head 22 containing swaging mechanism 30. Here there is shown plug 44 having a hollow bore for the introduction of fluid into the parison. One end of parison 18 is shown gripped between plug 44 and jaws 32. Jaws 32 slide in tracks 46 (see FIG. 7) in frame member 48. The sliding movement is effected by means of pins 50 which move in slots 52 (See FIGS. 4 and 5) in jaws 32. Pins 50 are actuated by means of rotating plate 54 which is shown in greater detail in FIG. 6. The swaging mechanism can be heated by way of heater 49.

Jaw members 32 can be either heated or at ambient temperature or can even contain cooling channels to maintain a proper temperature, depending on the individual utilization. The same is true for the plug 44. Particularly in dealing with parison preforms at orientation temperature which are to be transferred to a molding zone as opposed to forming the threads right in the molding zone as shown in FIG. 3, it may be desirable to heat the jaws sufficient to aid in forming the threads and then provide for cooling of at least the plug and perhaps the jaws also in order to set the plastic in the new shape.

Figure 4:
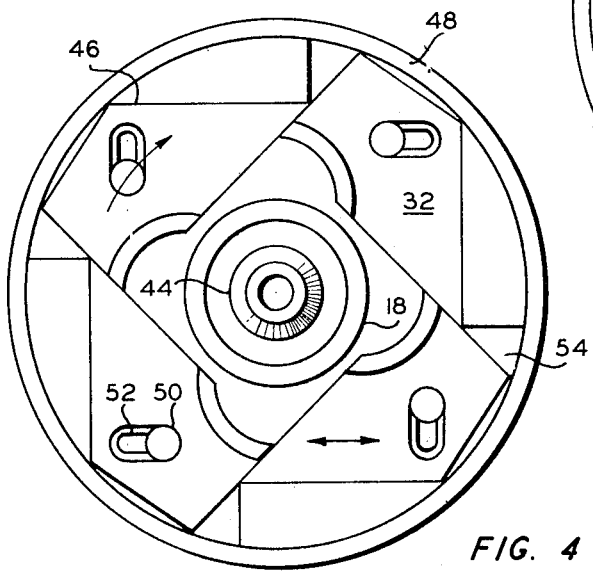
FIG. 4 is a bottom view of the mechanism of FIG. 3 as shown in the open position.

Referring now to FIG. 4, there is shown the swaging mechanism of FIG. 3 in a bottom view with the jaws in the open position.

Figure 5:
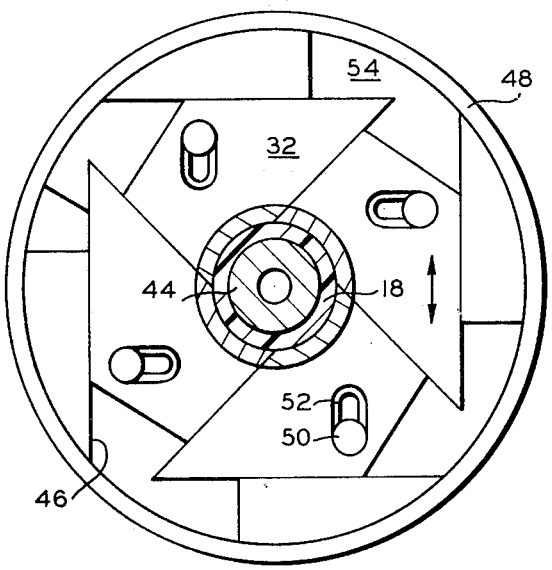
FIG. 5 is a view along section lines 5—5 of FIG. 3.

Referring now to FIG. 5, there is shown a view of the swaging mechanism identical to that of FIG. 4, except with the jaws in the closed position having compressed an end of parison 18 into a smaller diameter neck area.

Figure 6:
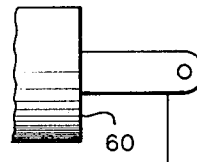
FIG. 6 is a view of the activating mechanism removed from the other parts.
Figure 6:
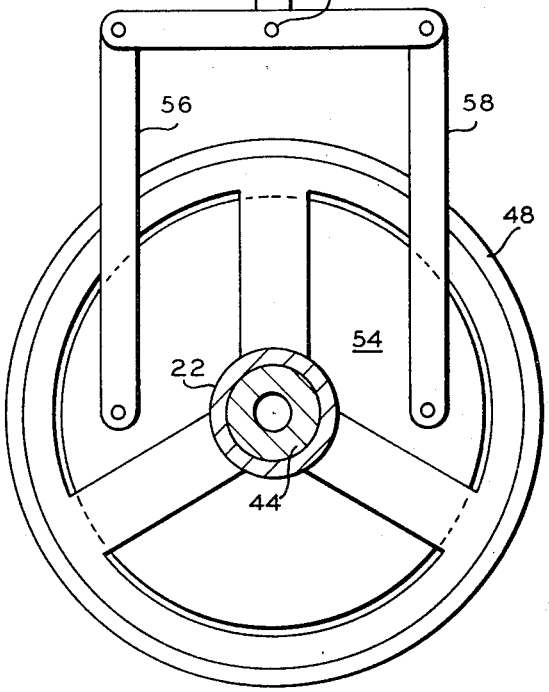

FIG. 6 shows a top view in greater detail the mechanism for activating pins 50. These pins are fixedly attached to rotating plate 54 within frame 48. Plate 54 is caused to rotate by the action of arms 56 and 58 which are activated through a mechanism pivotally connected at 59 with air cylinder 60. As air cylinder 60 moves forward, plate 54 is caused to rotate in a clockwise direction as viewed from the top, thus causing the jaws to close since this causes the pins to move in the direction shown by the arrow on FIG. 4.

Figure 7:
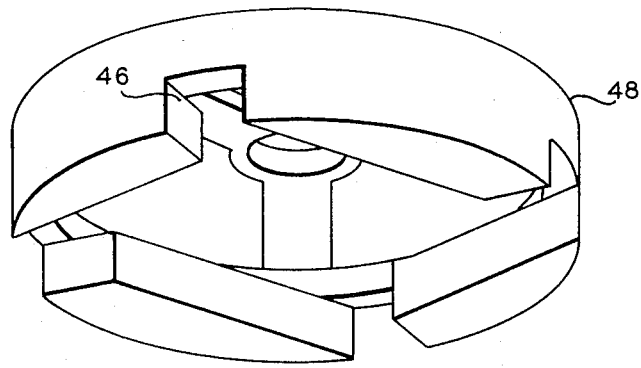
FIG. 7 is a view of the molding containing the tracks in which the swaging mechanism slides.

FIG. 7 shows a perspective view of the bottom of frame member 48 with all of the other parts removed so as to show the tracks 46 in which jaw members 32 slide.

Many conventional parts such as temperature controllers, heaters, frame members, and the like have been omitted for the sake of simplicity, but their inclusion is understood by those skilled in the art and is within the scope of the invention.

EXAMPLE

Propylene homopolymer having a density of 0.905 (ASTM D 1505–63T), a melt flow of 3.5 (ASTM D 1238–62T, Condition L), and a melting point of about 340° F. was extruded into tubing having an external diameter of 0.150 inch and a wall thickness of about 0.150. The tubing was cooled to room temperature and cut into 7-inch lengths. These 7-inch lengths were heated to a temperature of 320°–327° F. and an open end thereof compressed into a threaded neck finish having an external diameter of 0.850 inch and an internal diameter of 0.600 inch utilizing a mechanism having the jaw configuration shown in FIGS. 4 and 5. No flash was formed between the jaws. The thread-forming jaws in this example were heated. The same mechanism was utilized with an identical parison without heating the jaws. Again, the neck area was constricted from 1.150 inches outside diameter to 0.850 inch outside diameter with no flash being formed between the swaging jaws.

While this invention has been described in detail for the purpose of illustration it is not to be construed as limited thereby, but is intended to cover all changes and modifications within the spirit and scope thereof.

I claim:

1. In an apparatus comprising means to form a tubular extrudate, means to sever said extrudate into individual parison preforms, means to reheat said parisons to orientation temperature, and means to stretch said thus heated parisons longitudinally, the improvement comprising at least three movable swaging jaws disposed in an array about a central point, said jaws being so disposed that the angle, as measured in degrees, between the direction of movement of adjacent jaws is equal to $180-(360/n)$, $n$ being the total number of jaws, said jaws having a thread-forming surface, and wherein adjacent jaws are in sliding contact throughout said movement; and a plug centrally disposed such that an annulus is formed between the outer periphery of said plug and said thread-forming surfaces of said jaws when said jaws are in said closed position, said jaws cooperating with a neck-forming end of a pair of mold halves to give a hollow article-molding cavity.

2. Apparatus according to claim 1 comprising in addition means to heat said swaging jaws.

3. Apparatus according to claim 1 wherein said plug has a hollow bore for the introduction of fluid into said parison.

* * * * *